(12) United States Patent
Chen (10) Patent No.: US 8,698,096 B2
(45) Date of Patent: Apr. 15, 2014

(54) NANO-ANTENNA AND METHODS FOR ITS PREPARATION AND USE

(75) Inventors: Sung-Wei Chen, Las Vegas, NV (US); Christopher J. Rothfuss, legal representative, Laramie, WY (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/879,723

(22) PCT Filed: Aug. 16, 2012

(86) PCT No.: PCT/US2012/051093
§ 371 (c)(1),
(2), (4) Date: Apr. 16, 2013

(87) PCT Pub. No.: WO2014/028017
PCT Pub. Date: Feb. 20, 2014

(65) Prior Publication Data
US 2014/0048726 A1   Feb. 20, 2014

(51) Int. Cl.
*H01Q 15/00* (2006.01)
*H01Q 21/00* (2006.01)
*H01Q 21/06* (2006.01)
*H01Q 1/40* (2006.01)
*B82Y 10/00* (2011.01)

(52) U.S. Cl.
CPC .............. *H01Q 15/00* (2013.01); *H01Q 21/061* (2013.01); *H01Q 1/40* (2013.01); *B82Y 10/00* (2013.01)
USPC .............. 250/399; 250/208.2; 714/2; 714/17; 257/9; 257/43; 257/64; 257/432

(58) Field of Classification Search
CPC . H01Q 15/00; H01Q 21/061; H01Q 21/0087; H01Q 1/08; H01Q 1/40; B82Y 10/00; B82Y 20/00
USPC ............ 250/399, 208.2; 714/2, 17; 257/9, 43, 257/64, 432
See application file for complete search history.

(56) References Cited

U.S. PATENT DOCUMENTS 6,720,240 B2   4/2004   Gole et al.
6,730,395 B2   5/2004   Covington
(Continued)

FOREIGN PATENT DOCUMENTS

AT   400022 T   7/2008
AT   428981 T   5/2009
(Continued)

OTHER PUBLICATIONS

International Search Report and Written Opinion for PCT/US2012/051093 dated Nov. 16, 2012.
(Continued)

*Primary Examiner* — David A Vanore
(74) *Attorney, Agent, or Firm* — Pepper Hamilton LLP (57) ABSTRACT

Nano-antennas with a resonant frequency in the optical or near infrared region of the electromagnetic spectrum and methods of making the nano-antennas are described. The nano-antenna includes a porous membrane, a plurality of nanowires disposed in the porous membrane, and a monolayer of nanospheres each having a diameter that is substantially the same as a diameter of the nanowires. The nanospheres are electrically in series with the nanowires.

37 Claims, 3 Drawing Sheets

(56) References Cited

U.S. PATENT DOCUMENTS

| | | |
|---|---|---|
| 6,940,086 B2 | 9/2005 | Gole et al. |
| 7,089,445 B2 | 8/2006 | Kaiya et al. |
| 7,186,669 B2 | 3/2007 | Gole et al. |
| 7,243,256 B2 | 7/2007 | Kaiya et al. |
| 7,370,222 B2 | 5/2008 | Kaiya et al. |
| 7,464,288 B2 | 12/2008 | Kaiya et al. |
| 7,469,358 B2 | 12/2008 | Kaiya et al. |
| 7,474,823 B2 | 1/2009 | Wang et al. |
| 7,573,045 B2 | 8/2009 | Gorrell et al. |
| 7,834,349 B2 | 11/2010 | Gole et al. |
| 7,843,026 B2 | 11/2010 | Wang et al. |
| 7,873,860 B2 | 1/2011 | Kaiya et al. |
| 8,071,931 B2 | 12/2011 | Novack et al. |
| 8,283,619 B2 | 10/2012 | Novack et al. |
| 8,295,767 B2 * | 10/2012 | Brommer et al. ............ 455/41.2 |
| 8,497,131 B2 * | 7/2013 | Natan et al. .................... 436/56 |
| 2002/0001977 A1 | 1/2002 | Gole et al. |
| 2002/0074541 A1 | 6/2002 | Covington |
| 2003/0067003 A1 | 4/2003 | Gole et al. |
| 2004/0157414 A1 | 8/2004 | Gole et al. |
| 2004/0260966 A1 | 12/2004 | Kaiya et al. |
| 2005/0079132 A1 * | 4/2005 | Wang et al. .................. 424/1.11 |
| 2006/0014018 A1 | 1/2006 | Gole et al. |
| 2006/0242452 A1 | 10/2006 | Kaiya et al. |
| 2007/0120114 A1 | 5/2007 | Wang et al. |
| 2007/0161215 A1 | 7/2007 | Kaiya et al. |
| 2007/0174696 A1 | 7/2007 | Kaiya et al. |
| 2007/0178673 A1 | 8/2007 | Gole et al. |
| 2008/0083881 A1 | 4/2008 | Gorrell et al. |
| 2008/0089645 A1 | 4/2008 | Wang et al. |
| 2008/0147752 A1 | 6/2008 | Kaiya et al. |
| 2009/0049262 A1 | 2/2009 | Kaiya et al. |
| 2010/0284086 A1 | 11/2010 | Novack et al. |
| 2010/0307553 A1 * | 12/2010 | Defries et al. ................ 136/243 |
| 2011/0167962 A1 | 7/2011 | Ghanavi et al. |
| 2011/0195201 A1 | 8/2011 | Zhu et al. |
| 2011/0277805 A1 | 11/2011 | Novack et al. |
| 2012/0037515 A1 | 2/2012 | Solanki |
| 2012/0080073 A1 | 4/2012 | Kotter et al. |
| 2012/0119117 A1 | 5/2012 | Fourkas et al. |
| 2012/0170097 A1 | 7/2012 | Han et al. |
| 2012/0188540 A1 | 7/2012 | Bratkovski et al. |
| 2013/0148194 A1 * | 6/2013 | Altug et al. .................... 359/350 |
| 2013/0240758 A1 * | 9/2013 | Bourke et al. ............. 250/492.1 |
| 2014/0002824 A1 * | 1/2014 | Cheng et al. .................. 356/440 |

FOREIGN PATENT DOCUMENTS

| | | |
|---|---|---|
| CN | 1532682 A | 9/2004 |
| CN | 1291304 C | 12/2006 |
| CN | 102148429 A | 8/2011 |
| EP | 1465076 B1 | 7/2008 |
| EP | 1837766 B1 | 4/2009 |
| JP | 2004287648 A | 10/2004 |
| JP | 4165747 B2 | 10/2008 |
| KR | 20120077417 A | 7/2012 |
| WO | WO2008/048293 A2 | 4/2008 |
| WO | WO2008/048293 A3 | 4/2008 |
| WO | WO2009/064736 A1 | 5/2009 |
| WO | WO2010/120364 A2 | 10/2010 |
| WO | WO2010/120364 A3 | 10/2010 |
| WO | WO2011/050272 A2 | 4/2011 |

OTHER PUBLICATIONS

Abdel-Rahman et al. Design, fabrication, and characterization of antenna-coupled metal-oxide-metal diodes for dual-band detection, *Opt. Eng.* (Jun. 3, 2005), 44(6):066401 (Abstract).

Antenna Theory, http://www.antenna-theory.com (Printed from Internet Jan. 2, 2013).

Balanis, Antenna Theory: Analysis and Design, Third Edition, Apr. 2005.

Berland, Photovoltaic Technologies Beyond the Horizon: Optical Rectenna Solar Cell, Final Report, National Renewable Energy Laboratory, U.S. Department of Energy Laboratory (Aug. 1, 2001-Sep. 30, 2002), pp. 1-22.

Bharadwaj et al., Optical Antennas, *Advances in Optics and Photonics* (Aug. 11, 2009), 1:438-483.

Burke et al., Quantitative Theory of Nanowire and Nanotube Antenna Performance, *IEEE* (Aug. 19, 2004), pp. 1-15.

Ding et al., Fabrication of controllable free-standing ultrathin porous alumina membranes, *Nanotechnology* (Jun. 7, 2005), 16(8).

Engheta et al., Circuit elements at optical frequencies: nano-inductors, nano-capacitors and nano-resistors, *Physical Review Letters* (Aug. 26, 2005), 95:5503-5507.

Gonzalez et al., Comparison of dipole, bowtie, spiral and log-periodic IR antennas, *Infrared Physics & Technology* (Nov. 10, 2004), 46:418-428.

Kissing number proglem, http://en.wikipedia.org/wiki/Kissing_number_problem (Printed from Internet Jan. 2, 2013).

I-Mirconews, http://i-micronews.com/reports (Printed from Internet Jan. 2, 2013).

Mivelle et al., Bowtie nano-aperture as interface between near-fields and a single-mode fiber, *Optics Express* (Jul. 13, 2010), 18(15):15964-15974.

Nalwa, Nanostructured materials and nanotechnology, *Handbook of Nanostructured Materials and Nanotechnology*, Academic Press (2002), pp. 1-834 (Abstract).

Osgood III, Nanoantennas with short-wavelength resonance, *Proc. of SPIE* (2008), 7032:703206:1-703206:10.

Pike Research in the News: Renewable Distributed Energy Generation Market to Triple in Size by 2015, Nov. 30, 2010, http://www.pikeresearch.com/newsroom/renewable-distributed-energy-generation-market-to-triple-in-size-by-2015.

Rayford II et al., Optical Properties of Gold Nanospheres, *Nanoscape* (2005), 2(1):27-33.

World Pigment Market, Market Report, (Dec. 2007) (Abstract).

Xu et al., Optical transmission spectra of ordered porous alumina membranes with different thicknesses and porosities, *Optical Materials* (Jul. 2006), 28(10):1160-1165 (Abstract).

Yang et al., Transparent lithium-ion batteries, *PNAS* (Jul. 25, 2011), 108(32):13013-13018.

Zhang et al., Resonant slot nanoantennas for surface plasmon radiation in optical frequency range, *Appl. Phys. Lett.* (2012); 100:241115.

Zhao et al., Effects of shape and loading of optical nanoantennas on their sensitivity and radiation properties, *J. Opt. Soc. Am. B* (Apr. 27, 2011), 28(5):1266-1274.

* cited by examiner

FIG. 3

NANO-ANTENNA AND METHODS FOR ITS PREPARATION AND USE

CLAIM OF PRIORITY

This application is a U.S. national stage filing under 35 U.S.C. §371 of International Application No. PCT/US2012/051093 filed Aug. 16, 2012 entitled "Nano-Antenna and Methods for Its Preparation and Use," the disclosure of which is incorporated by reference in its entirety.

BACKGROUND

An antenna is generally a transducer device that receives or transmits electromagnetic radiation. The frequency of radiation that may be received or transmitted by an antenna is dependent on the size of the antenna, and the speed of light and the distance that electrons can travel (electron mobility) in the material medium of the antenna. Because electromagnetic waves propagate more slowly in a medium than in free space, the same number of waves will span a greater distance in free space than in the transmission medium, hence the transmission medium is said to have an electrical length that is greater than its physical length. Typically, the electrical length of an antenna is expressed in units of the wavelength (in the antenna medium) corresponding to the resonant frequency of the antenna.

Antennas are typically associated with signals having frequency of about 30 kilohertz (kHz) to about 30 gigahertz (GHz), and may be associated with, for example, longwave AM radio broadcasting, wireless LAN, radars and satellite television broadcasting. In general, the electrical length of an antenna is on the order of the free-space wavelength of the radiation at which the antenna is resonant. For example, a dipole antenna is typically about $\frac{1}{4}^{th}$ the free-space wavelength. Similarly, the physical length of an antenna is on the order of the wavelength in the antenna medium of the radiation at which the antenna is resonant. Given that the wavelength of electromagnetic radiation is shorter in a medium than in free space, the physical length of an antenna is typically shorter than its electrical length.

The electrical length of an antenna can be modified in order to cause an antenna of a particular physical length to resonate at a required frequency, by adding suitable reactive elements such as capacitors or inductors. For low frequency (long wavelength) transmission or reception, the physical length of an antenna becomes too long to be economically or physically viable. The electrical length of the antenna is, therefore, lengthened by adding suitable reactive elements to allow a shorter antenna to resonate at lower frequencies. On the other hand transmission or reception of higher frequencies, for example optical frequencies, may necessitate shortening the electrical length of the antenna in order to make the physical length longer.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of manufacturing a nano-antenna is described. A plurality of nanowires are disposed in a porous membrane and a monolayer of nanospheres to form the nano-antenna. The nanospheres have a diameter substantially the same as a diameter of the nanowires is placed electrically in series with the nanowires.

In an embodiment, a nano-antenna comprising a porous membrane, a plurality of nanowires disposed in the porous membrane and a monolayer of nanospheres electrically in series with the nanowires is described. The nanospheres have substantially the same diameter as the nanowires.

In an embodiment, a method of manufacturing a tunable colorant is described. The method may include providing at least one nano-antenna, and placing at least one reactive element, that may be made from nanospheres, in electrical contact with the nano-antenna.

In an embodiment, a tunable colorant may include a nano-antenna and a resistive element. The nano-antenna may include a porous membrane, a plurality of nanowires disposed in the porous membrane, and a monolayer of nanospheres electrically in series with the nanowires. The nanospheres have substantially the same diameter as the nanowires.

BRIEF DESCRIPTION OF DRAWINGS

In the detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Every antenna has a characteristic impedance, which is defined as the ratio of voltage to current at any given point in the antenna. In general, the impedance of an antenna is a complex number dependent on the frequency of the voltage (or current). The real part of the complex impedance is pure resistance and is frequency independent. The complex part (also called reactance) is the frequency dependent part of the impedance and may be either directly proportional to the frequency (inductive reactance) or inversely proportional to the frequency (capacitive reactance). The resonant frequency of an antenna is defined as the frequency at which the capacitive impedance and the inductive impedance of the antenna are equal and opposite to each other, thereby cancelling each other and making the impedance at that frequency purely resistive. The voltage and current at this frequency are in phase with each other.

The complex impedance of an antenna may be determined by the following formula:

$$Z_a = R_a + iX_a \quad \text{(Eq. I)}$$

where $R_a$ is the resistance and $X_a$ is the reactance of the antenna, having a capacitive component and an inductive component according to:

$$X_a = X_c + X_L = (-1/\omega C) + \omega L \quad \text{(Eq. II)}$$

where $\omega = 2\pi f$ is the angular frequency and f is the frequency.

It is evident that by changing one or both of the inductive impedance and the capacitive impedance, the resonant frequency of an antenna can be changed.

In general, the resonant frequency of an antenna depends on the geometry and the material of the antenna, but may be modulated by adding reactive elements to the antenna circuit. The physical length of an antenna is, in general, roughly inversely proportional to the resonant frequency. Increasing the resonant frequency of an antenna of a given geometry by adding a capacitive element is referred to as electrically shortening the antenna, thereby allowing resonance at higher frequencies than would otherwise be determined by its physical length. Decreasing the resonant frequency of an antenna of a given geometry by adding an inductive element is referred to as electrically lengthening the antenna, thereby allowing resonance at lower frequencies than would otherwise be determined by its physical length.

Given that the wavelength for optical and near infrared frequencies (about 12 terahertz (THz) to about 800 THz) is about 1 micrometer (μm) to about 400 nanometer (nm), the required physical length of antennas resonating at optical and near infrared frequencies makes fabricating such antennas a significant challenge. Because optical frequencies are in the range of plasma frequencies of metals, quantum effects apply at these frequencies and classical antenna theory has to be modified. As such, nano-scale fabrication of antennas coupled with electrical shortening using suitable non-classical nano-scale reactive elements may provide a potential solution for creating nano-antennas resonating at optical and near infrared frequencies.

Figure 1:
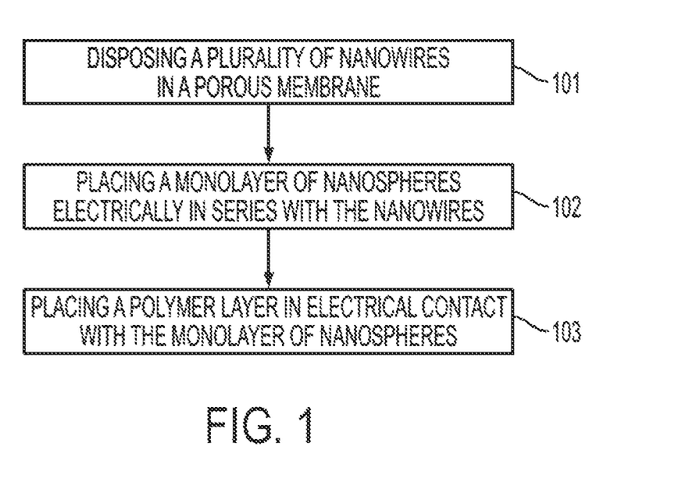
FIG. 1 depicts a flow diagram for an illustrative method of manufacturing a nano-antenna according to an embodiment.

FIG. 1 depicts a flow diagram of an illustrative method of manufacturing a nano-antenna according to an embodiment. The method may include disposing 101 a plurality of nanowires in a porous membrane and placing 102 a monolayer of nanospheres electrically in series with the nanowires to form a nano-antenna. The nanospheres may have substantially the same diameter as the nanowires. In some embodiments, the nano-antenna may have a resonant frequency of about 12 THz to about 800 THz. Specific examples of the resonant frequency can include 12 THz, 25 THz, 50 THz, 100 THz, 200 THz, 300 THz, 400 THz, 500 THz, 600 THz, 700 THz, 800 THz, and ranges between any two of these values.

In some embodiments, the method may further include placing 103 a polymer layer in electrical contact with the monolayer of nanospheres. In some embodiments, the polymer layer may be placed 103 over the monolayer of nanospheres, for example, by depositing the polymer layer using a chemical process. In some embodiments, the polymer layer may be placed 103 such that the monolayer of nanospheres and the polymer layer are electrically in series with each other. In other embodiments, the polymer layer may be placed 103 such that the monolayer of nanospheres and the polymer layer are electrically in parallel with each other.

In some embodiments, the nanowires may be deposited 101 in the porous membrane by physical vapor deposition. In some embodiments, the nanowires may be formed 101 in a thin film by using photolithography followed by etching away the thin film. In some embodiments, the nanowires may be formed by self-assembly.

In some embodiments, the nanospheres may be deposited 102 in a well adjoining the nanowires to form a monolayer. The well may be formed by etching the porous membrane in an area defined by using photolithography. In some embodiments, the nanospheres may be deposited 102 on the porous membrane to form a monolayer such that the nanospheres are in contact with the nanowires.

In some embodiments, the polymer layer may be deposited 103 using a chemical vapor deposition process. In some embodiments, the polymer layer may be deposited 103 by placing a thin film of a polymer on top of the monolayer of nanospheres.

Various embodiments of the nano-antenna are described herein.

Figure 2:
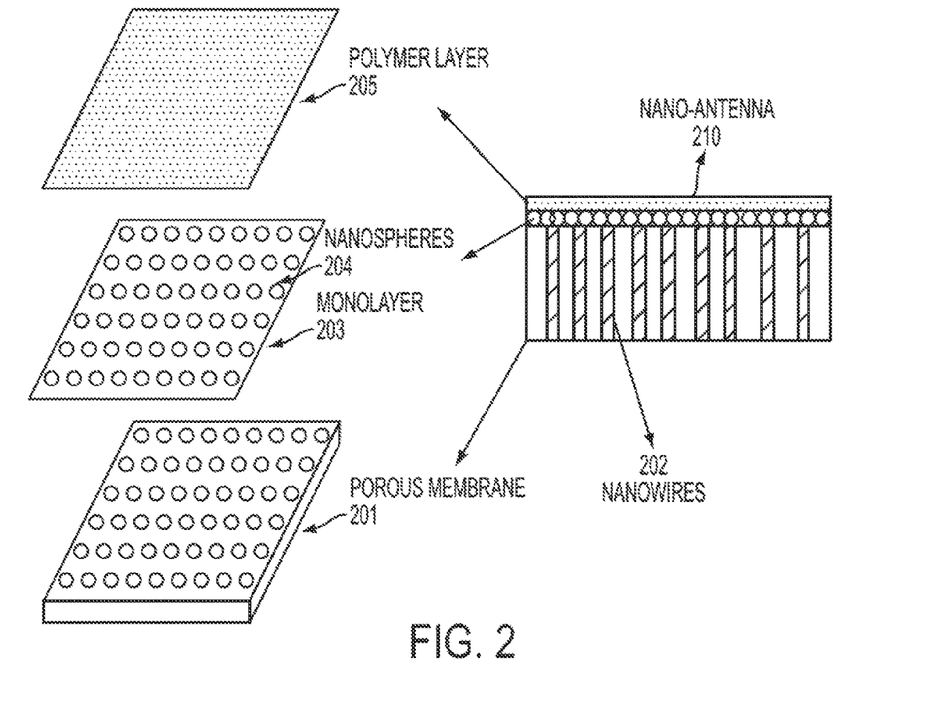
FIG. 2 depicts a schematic of an illustrative nano-antenna according to an embodiment.

FIG. 2 depicts a schematic of an illustrative nano-antenna according to an embodiment. The nano-antenna 210 includes a porous membrane 201, a plurality of nanowires 202 disposed in the porous membrane 201, and a monolayer 203 of nanospheres 204 with substantially the same diameter as the nanowires 202 electrically in series with the nanowires. In some embodiments, the nano-antenna 210 has a resonant frequency of about 12 THz to about 800 THz (near infrared to optical).

In some embodiments, the porous membrane 201 may be made of, for example alumina, silicon, silicon dioxide, polymethyl methacralate, and so forth.

In some embodiments, the nano-antenna 210 may additionally have a polymer layer 205 in electrical contact with the monolayer of nanospheres. In certain embodiments, the polymer layer 205 may be an insulating layer made from, for example, polydimethyl siloxane (PDMS), polymethyl methacralate (PMMA), polyethylene (PE), polystyrene (PS), polypropylene, polyethylene terephthalate (PET), polycarbonate, polyacrylate, neoprene, nylon, polyvinyl chloride (PVC), polyvinyl butyral (PVB), polyacrylonitrile, silicone, combinations of any two or more, and/or the like. In other embodiments, the polymer layer 205 may be a conductive layer made from, for example, polyacetylene, polypyrrole, polyaniline, poly(p-phylene vinylene), polythiophenes, and/or the like.

A nano-antenna resonating at optical and infrared frequencies may be used in applications such as conversion of solar energy into electrical energy instead of or in addition to photovoltaic panels. In such applications, it may be desirable for the nano-antenna 210 to be transparent or translucent. In some embodiments, one or more of the porous membrane 201, the nanowires 202, the monolayer 203 of nanospheres 204, and the polymer layer 205 may be transparent. In other embodiments, one or more of the porous membrane 201, the nanowires 202, the monolayer 203 of nanospheres 204, and the polymer layer 205 may be translucent.

A capacitive reactance has an effect of shortening the electrical length of an antenna, whereas an inductive reactance has an effect of lengthening the electrical length of an antenna. The nanowires 202 may act as a nano-antenna 210 for which the resonant frequency is determined by the physical length of the nanowires 202. Depending on the specific application, it may be required to lengthen or shorten the electrical length of the nano-antenna 210 corresponding to its use for a certain frequency. A capacitive reactance may be added by adding a monolayer 203 of dielectric nanospheres 204 electrically in series with nanowires 202. An inductive reactance may be added by adding a monolayer 203 of conducting nanospheres 204 electrically in series with the nanowires 202. In some embodiments, the nanospheres 204 may be made of dielectric materials such as, for example, polymers, glasses, silica, carbohydrates, lignins, combinations thereof, and/or the like. In other embodiments, the nanospheres 204 may be made of conductive materials including, without limitation, metals, conductive polymers and/or the like. In certain embodiments, where transparency is desired, the nanospheres 204 may be made of a transparent polymer material.

The resistance $R_a$ (Eq. I), the capacitive impedance $X_C$ (Eq. II), and the inductive impedance $X_L$ (Eq. II), and thereby the resonant frequency of a nano-antenna 210 are dependent on the dimensions of the nanowires 202 and the nanospheres 204 forming the nano-antenna. In some embodiments, the nanowires 202 may have an aspect ratio of about 3:1 (height to diameter) to provide appropriate impedance to the nano-antenna 210. In certain embodiments, the nanowires 202 may be made of a metal such as, for example, gold (Au), silver (Ag), iron (Fe), titanium (Ti), platinum (Pt), copper (Cu), zinc (Zn), aluminum (Al), manganese (Mn), cobalt (Co), nickel (Ni), combinations thereof, alloys thereof, and/or the like. In other embodiments, the nanowires 204 may be made of a doped semiconductor such as, for example, boron doped silicon, phosphorous doped silicon, and/or the like. In yet other embodiments, the nanowires 202 may be of a doped metal oxide such as, for example, fluorine doped tin oxide, indium doped tin oxide, and/or the like. A skilled artisan will realize that a nano-antenna 210 may be formed by combining nanowires 202 of any of the appropriate materials listed herein in any combination thereof.

The reactance offered by the nanospheres 204 is dependent on the size of the nanospheres. Depending on the application, the size of the nanowires 202, and the required resonant frequency, as determined from the equations listed above the nanospheres 204 may have a diameter of about 5 nm to about 50 nm, about 50 nm to about 100 nm, about 100 nm to about 200 nm, about 200 nm to about 300 nm, about 300 nm to about 400 nm, about 400 nm to about 500 nm, or any combination thereof. Specific examples of diameters include about 5 nm, about 50 nm, about 100 nm, about 200 nm, about 300 nm, about 400 nm, about 500 nm, and ranges between any two of these values.

In some embodiments, the nanospheres 204 may be made of dielectric materials such as, for example, polymers, glasses, silica, carbohydrates, lignin, combinations thereof, and/or the like. In other embodiments, the nanospheres 204 may be made of conductive materials including, without limitation, metals, conductive polymers and/or the like. In certain embodiments, where transparency is desired, the nanospheres 204 may be of a transparent polymer material.

Figure 3:
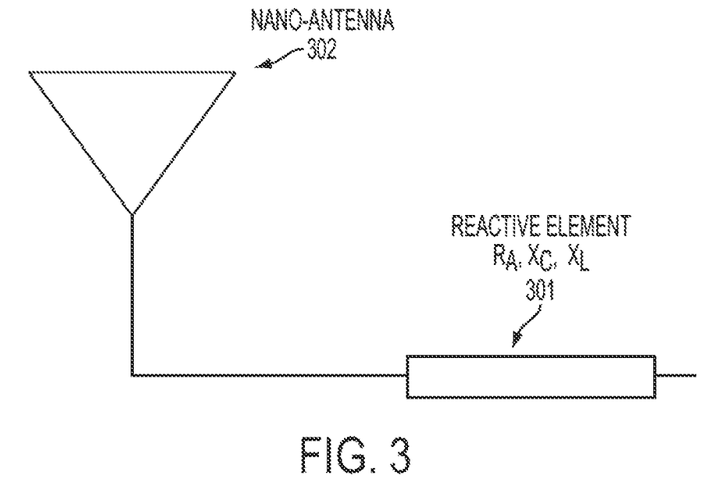
FIG. 3 depicts a symbolic diagram of an illustrative tunable colorant according to an embodiment.

A nano-antenna resonating at a specific frequency in the optical range may act as an absorber for the color corresponding to the resonant frequency if the energy received from that color is completely dissipated. Energy received by a nano-antenna may be dissipated as heat, for example, by coupling the nano-antenna with a resistive element. A nano-antenna coupled to a resistive element, when placed on a reflective surface may act as a colorant by removing a specific color from the reflected light. For example, a nano-antenna resonating at a red frequency (about 670 nm to about 750 nm) when coupled with a resistive element would remove red color from the reflected spectrum, resulting in the surface appearing cyan. In some aspects, methods of manufacturing a tunable colorant are described. FIG. 3 depicts a symbolic diagram of an illustrative tunable colorant according to an embodiment. A tunable colorant may be manufactured by placing at least one reactive element 301 in electrical contact with a nano-antenna 302. Various embodiments of the nano-antenna have been described herein. In some embodiments, the nano-antenna may have a resonant frequency of about 12 THz to about 800 THz.

In some embodiments, the nano-antenna 302 may have a dipole, a monopole, or a slot configuration. In some embodiments, the nano-antenna 302 may have a specific directivity, or specific polarization. Various embodiments of the nano-antenna are described herein.

In some embodiments, the at least one reactive element 301 may include nanospheres. In some embodiments, the at least one reactive element 301 may be a capacitive element made of dielectric nanospheres with positive permittivity. In some embodiments, the at least one reactive element 301 may be an inductive element made of conductive nanospheres with negative permittivity. In some embodiments, the at least one reactive element 301 is a resistive element made of an insulating polymer layer. The resistive element may, in some embodiments, be either in an electrically parallel configuration with the nano-antenna 302 or electrically in series with the nano-antenna 302. Various embodiments of nanospheres that may form the at least one reactive element are described herein.

In some embodiments the at least one reactive element 301 is configured to allow modulation of the reactance of the reactive element. In certain embodiments, the amount of modulation is determined by a computer-simulation of the nano-antenna 302.

In some aspects, a tunable colorant is described. The tunable colorant includes a nano-antenna 302 and a resistive element 301. The nano-antenna 302 may be configured such that the resonant frequency of the nano-antenna may depend on the resistance of the resistive element 301. In such a configuration, the color of the colorant changes based on the resistance of the resistive element. In some embodiments, the nano-antenna 302 has a resonant frequency of about 12 THz to about 800 THz. Various embodiments of the nano-antenna 302 have been described herein.

In some embodiments, the resistive element is configured such that the resistance of the resistive element is altered by a biological process such as, for example, attachment, absorption, or adsorption of specific molecules, antibodies, antigens, proteins, and the like. In some embodiments, the resistive element is configured to dissipate energy absorbed by the nano-antenna as heat.

EXAMPLES

Example 1

Fabrication of a 50 THz Gold Nanowire Nano-Antenna

Monopole nano-antennas electrically shortened by dielectric nanospheres are constructed. The resonant frequency of the nano-antenna is 50 THz (free-space wavelength of 600 nm) corresponding to an orange color. A 100 nm thick porous alumina membrane 201 (in FIG. 2) with a pore size of about 24 nm is used for construction of these nano-antennas. The pores are filled with gold by electro-deposition to form nanowires 201. A monolayer 203 of 24 nm diameter nanospheres 204 of PMMA is deposited on top of the gold filled alumina membrane, followed by placing a 2 µm thick layer 205 of PDMS on top of the nanospheres to form the nanoantenna 210.

The monolayer of the PMMA nanospheres is absorbed to the alumina surface by concentration limited diffusion. A suspension containing PMMA nanospheres is diluted suitably and disposed on the alumina surface.

The PDMS layer is placed by mixing the PDMS pre-cursors in suitable ratios, degassing the resulting mixture, disposing a suitable amount (calculated based on the area and thickness of the layer required) of the degassed mixture to form a thin layer of PDMS, followed by curing the formed layer for at least about 8 hours at a temperature of about 45° C.

Example 2

Fabrication of a Cyan Colored Coating

Gold nanowires of about 24 nm are fabricated as in example 1. Monopole antennas resonating at a frequency of 50 THz (free-space wavelength of 600 nm) are formed using the gold nanowires by shortening the electrical wavelength of the nanowires by depositing PMMA nanospheres of about 24 nm in diameter. The resonant frequency of 50 THz corresponds to red/orange color in air. A film including monopole nano-antennas constructed in this fashion, when exposed to white light, strongly absorb light at 600 nm (red/orange) resulting in a cyan coloration. The color of such a coating may be changed by changing the diameter of the gold nanowires or the PMMA nanospheres.

Example 3

A Biologically Tunable Colorant

The PMMA nanospheres from Example 2 are functionalized by attaching a monoclonal antibody specific to a particular antigen. Nano-antennas having functionalized PMMA nanospheres are incorporated in a film. When this film is exposed to the particular antigen, the antigen specifically attaches to the antibody, thereby changing the capacitance of the PMMA nanospheres. This results in a change in resonant frequency of the nano-antennas, giving an optical signal, wavelength shift, and/or quenching an optical signal that is dependent on the amount of antigen attached to the nanospheres.

Similar embodiments for biologically tunable colorants can be constructed by using functionalized metal nanospheres. In such a case, the change in inductance of the metal nanospheres is dependent on the amount of antigen attached to the nanospheres.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of manufacturing a nano-antenna, the method comprising:
    disposing a plurality of nanowires in a porous membrane, wherein each nanowire has a diameter; and
    placing a monolayer of nanospheres electrically in series with the plurality of nanowires, wherein the nanospheres have substantially the same diameter as the nanowires.

2. The method of claim 1, further comprising placing a polymer layer in electrical contact with the monolayer of nanospheres.

3. The method of claim 2, wherein the polymer layer comprises a conductive layer.

4. The method of claim 2, wherein placing the polymer layer comprises placing the polymer layer over the monolayer of nanospheres.

5. The method of claim 2, wherein placing the polymer layer comprises placing the polymer layer electrically in series with the monolayer of nanospheres.

6. The method of claim 2, wherein each of the porous membrane, the plurality of nanowires, and the polymer layer are visibly transparent.

7. The method of claim 2, wherein each of the porous membrane, the plurality of nanowires, and the polymer layer are visibly translucent.

8. The method of claim 2, wherein the polymer layer comprises an insulating layer comprising one or more of polydimethyl siloxane (PDMS), polymethyl methacralate (PMMA), polyethylene (PE), polystyrene (PS), polypropylene, polyethylene terephthalate (PET), polycarbonate, polyacrylate, neoprene, nylon, polyvinyl chloride (PVC), polyvinyl butyral (PVB), polyacrylonitrile, silicone, and a combination thereof.

9. The method of claim 1, wherein the nanospheres comprise dielectric nanospheres.

10. The method of claim 1, wherein the nanospheres comprise conductive nanospheres.

11. The method of claim 1, wherein the nanospheres comprise a transparent polymer.

12. The method of claim 1, wherein the nanospheres have a diameter of about 5 nm to about 500 nm.

13. The method of claim 1, wherein the aspect ratio of the nanowires is at least 3:1 (height to diameter).

14. The method of claim 1, wherein the plurality of nanowires comprise gold nanowires.

15. The method of claim 1, wherein the nano-antenna has a resonance frequency of about 12 THz to about 800 THz.

16. A nano-antenna comprising:
    a porous membrane;
    a plurality of nanowires disposed in the porous membrane, wherein each nanowire has a diameter; and
    a monolayer of nanospheres electrically in series with the plurality of nanowires, wherein the nanospheres have substantially the same diameter as the nanowires.

17. The nano-antenna of claim 16, further comprising a polymer layer in electrical contact with the monolayer of nanospheres.

18. The nano-antenna of claim 17, wherein the polymer layer comprises a conductive layer.

19. The nano-antenna of claim 17, wherein the polymer layer is disposed over the monolayer of nanospheres.

20. The nano-antenna of claim 17, wherein the polymer layer is disposed electrically in series with the monolayer of nanospheres.

21. The nano-antenna of claim 17, wherein each of the porous membrane, the plurality of nanowires, and the polymer layer are visibly transparent.

22. The nano-antenna of claim 17, wherein each of the porous membrane, the plurality of nanowires, and the polymer layer are visibly translucent.

23. The nano-antenna of claim 17, wherein the polymer layer comprises an insulating layer comprising one or more of polydimethyl siloxane (PDMS), polymethyl methacralate (PMMA), polyethylene (PE), polystyrene (PS), polypropylene, polyethylene terephthalate (PET), polycarbonate, polyacrylate, neoprene, nylon, polyvinyl chloride (PVC), polyvinyl butyral (PVB), polyacrylonitrile, silicone, and a combination thereof.

24. The nano-antenna of claim 16, wherein the nanospheres comprise dielectric nanospheres.

25. The nano-antenna of claim 24, wherein the nanospheres comprise conductive nanospheres.

26. The nano-antenna of claim 16, wherein the nanospheres comprise a transparent polymer.

27. The nano-antenna of claim 16, wherein the nanospheres have a diameter of about 5 nm to about 500 nm.

28. The nano-antenna of claim 16, wherein the nanowires have a height, a diameter and an aspect ratio at least 3:1 (height to diameter).

29. The nano-antenna of claim 16, wherein the plurality of nanowires comprise gold nanowires.

30. The nano-antenna of claim 16, wherein the nano-antenna has a resonance frequency of about 12 THz to about 800 THz.

31. A method of manufacturing a tunable colorant, the method comprising:
    providing at least one nano-antenna, wherein the nano-antenna comprises:
        a porous membrane;
        a plurality of nanowires disposed in the porous membrane, wherein each nanowire has a diameter; and
        a monolayer of nanospheres electrically in series with the plurality of nanowires, wherein the nanospheres have substantially the same diameter as the nanowires; and
    placing at least one reactive element comprising nanospheres in electrical contact with the nano-antenna.

32. A tunable colorant comprising:
    a nano-antenna comprising a porous membrane, a plurality of nanowires disposed in the porous membrane, wherein each nanowire has a diameter, and a monolayer of nanospheres electrically in series with the plurality of nanowires, wherein the nanospheres have substantially the same diameter as the nanowires; and a resistive element, wherein the colorant is configured to change color based on a resistance of the resistive element.

33. The tunable colorant of claim 32, wherein the resistive element has a resistance configured to be altered by a biological process.

34. The tunable colorant of claim 32, wherein the nanoantenna has a resonance frequency of about 12 THz to about 800 THz.

35. The tunable colorant of claim 32, wherein the nanoantenna has specific directivity or polarization.

36. The tunable colorant of claim 32, wherein the nanoantenna is configured to absorb energy at a resonance frequency.

37. The tunable colorant of claim 32, wherein the resistive element is configured to dissipate energy as heat.

* * * * *